(No Model.)

T. M. BISSELL.
WHEEL FOR SULKY PLOWS.

No. 260,274. Patented June 27, 1882.

Witnesses
F. L. Durand
W. R. Keyworth

Inventor
T. M. Bissell
per
T. H. Alexander
Atty.

UNITED STATES PATENT OFFICE.

THELUS M. BISSELL, OF SOUTH BEND, INDIANA.

WHEEL FOR SULKY-PLOWS.

SPECIFICATION forming part of Letters Patent No. 260,274, dated June 27, 1882.

Application filed May 19, 1882. (No model.)

*To all whom it may concern:*

Be it known that I, THELUS M. BISSELL, of South Bend, in the county of St. Joseph and State of Indiana, have invented certain new and useful Improvements in Wheels for Sulky-Plows; and I do hereby declare that the following is a full, clear, and exact description thereof, reference being had to the accompanying drawings, and to the letters of reference marked thereon, which form part of this specification, in which—

Figure 1:
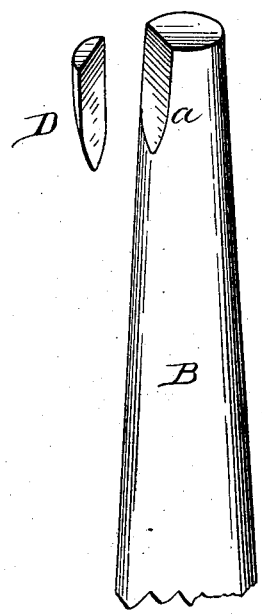
Figure 2:
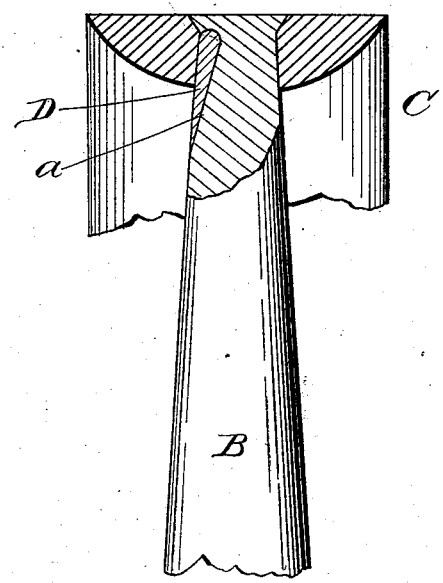
Figure 3:
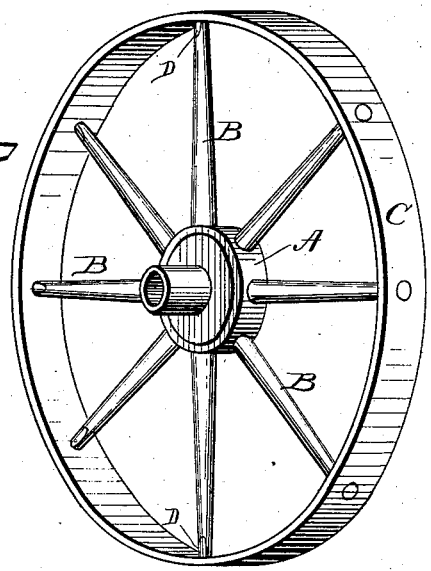

Figure 1 is a perspective view of part of a spoke having its end beveled to receive a wedge or key, which is also shown in this figure. Fig. 2 is a cross-section, showing a spoke secured to the tire of the wheel. Fig. 3 is a perspective view of the wheel complete.

This invention relates to an improvement in the construction of wheels which are especially designed for sulky-plows, but which may be used for other purposes; and the nature of my invention consists in a novel manner of securing the outer ends of the spokes to the metal rim or tire of a wheel, as will be fully understood from the following description when taken in connection.

The wheel is composed of a cast-metal hub, A, wrought-iron spokes B, and a rolled-steel tire, C. These parts are secured together as follows: The tire or rim C, properly pierced with countersunk holes, is placed on a suitable frame, with the spokes loosely inserted into their respective holes. In connection with said frame is a molding-box containing channels for the inner ends of said spokes, and the form for the hub is exactly centered with the tire or rim C. The hub is then cast about the inner ends of the spokes, and as it cools and shrinks the free ends of the spokes will move in the perforations through the rim C.

One side of each spoke is beveled, as shown at *a*, and a steel key, D, is formed of a shape to fill this space. After the hub has shrunk and cooled, the key D is inserted into the tire alongside of the beveled surface *a* and driven tightly home. I thus bind the spoke and the rim C as firmly together as though they were welded. The key or wedge D is then cut off at *b*, the depth of the countersink and the projecting end of the spoke B is upset and riveted down over it, as indicated at *c*. I thus make a wheel which is simple and cheap and also exceedingly substantial.

Having thus fully described my invention, what I claim as new, and desire to secure by Letters Patent, is—

A metal wheel having the inner ends of the spokes cast in the hub, and the outer ends secured to the rim by means of keys or wedges D, and the upset portions *c* of the spokes covering the ends of said keys or wedges, substantially as described.

In testimony that I claim the foregoing as my own I affix my signature in presence of two witnesses.

THELUS M. BISSELL.

Witnesses:
 JAMES DU SHANE,
 DAVID B. CREVISTON.